(12) United States Patent
Sheahan et al.

(10) Patent No.: US 7,243,174 B2
(45) Date of Patent: Jul. 10, 2007

(54) SYSTEM AND METHOD FOR COMMUNICATING WITH AN APPLIANCE THROUGH AN OPTICAL INTERFACE USING A CONTROL PANEL INDICATOR

(75) Inventors: Thomas J. Sheahan, Cary, IL (US); Michael P. Sullivan, Algonquin, IL (US)

(73) Assignee: Emerson Electric Co., St. Louis, MO (US)

( * ) Notice: Subject to any disclaimer, the term of this patent is extended or adjusted under 35 U.S.C. 154(b) by 885 days.

(21) Appl. No.: 10/602,933

(22) Filed: Jun. 24, 2003

(65) Prior Publication Data

US 2004/0267947 A1 Dec. 30, 2004

(51) Int. Cl.
G06F 13/12 (2006.01)
G08B 5/00 (2006.01)
G08C 19/12 (2006.01)
(52) U.S. Cl. ............... 710/72; 340/815.4; 341/176
(58) Field of Classification Search ............... 710/72; 340/815.4; 341/176
See application file for complete search history.

(56) References Cited

U.S. PATENT DOCUMENTS

| | | | |
|---|---|---|---|
| 4,001,578 A | 1/1977 | Cook et al. | |
| 4,023,887 A | 5/1977 | Speers | |
| 4,063,083 A | 12/1977 | Cathey et al. | ............... 250/199 |
| 4,259,570 A | 3/1981 | Leonard | |
| 4,329,684 A | 5/1982 | Monteath et al. | |
| 4,482,953 A | 11/1984 | Burke | |
| 4,572,927 A | 2/1986 | Huft | |
| 4,593,391 A | 6/1986 | Mizushima et al. | |
| 4,628,443 A | 12/1986 | Rickard et al. | |
| 4,631,726 A | 12/1986 | Schoon | |
| 4,633,522 A | 12/1986 | Yamamoto et al. | |
| 4,634,845 A | 1/1987 | Hale et al. | |
| 4,638,299 A | 1/1987 | Campbell | |
| 4,639,917 A | 1/1987 | Furuta | |
| 4,661,953 A | 4/1987 | Venkatesh et al. | |
| 4,680,811 A | 7/1987 | Harper et al. | |
| 4,755,997 A | 7/1988 | Takahashi | |
| 4,773,032 A | 9/1988 | Uehara et al. | |
| 4,868,893 A | 9/1989 | Hammond | |
| 4,870,264 A | 9/1989 | Beha | |
| 4,907,250 A | 3/1990 | Ricks | |
| 4,924,382 A | 5/1990 | Shouda | |
| 4,941,205 A | 7/1990 | Horst et al. | |
| 4,957,348 A | 9/1990 | May | |
| 4,970,870 A | 11/1990 | Midlang et al. | |
| 4,977,394 A | 12/1990 | Manson et al. | |
| 5,043,860 A | 8/1991 | Koether et al. | ............. 364/138 |
| 5,065,456 A | 11/1991 | Nakayama | |

(Continued)

FOREIGN PATENT DOCUMENTS

DE 100 35 642 12/2001

(Continued)

*Primary Examiner*—Krisna Lim
(74) *Attorney, Agent, or Firm*—Maginot, Moore & Beck

(57) ABSTRACT

The invention is a communication management module for effectively controlling an optical interface that uses a control panel indicator in an appliance for communication. The module includes a physical, framing, transport, dispatch, and application layers. The module is implemented to verify the integrity of data frames and to correlate data frames and responses with applications in the application layer.

47 Claims, 7 Drawing Sheets

U.S. PATENT DOCUMENTS

| | | |
|---|---|---|
| 5,093,879 A | 3/1992 | Bregman et al. |
| 5,122,893 A | 6/1992 | Tolbert ................ 359/152 |
| 5,212,888 A | 5/1993 | Cary et al. |
| 5,274,673 A | 12/1993 | Kaharu et al. |
| 5,285,375 A | 2/1994 | Kim |
| 5,306,995 A | 4/1994 | Payne et al. |
| 5,321,229 A | 6/1994 | Holling et al. |
| 5,345,230 A | 9/1994 | Jackson et al. |
| 5,350,140 A | 9/1994 | Ripley et al. |
| 5,359,273 A | 10/1994 | Flückiger |
| 5,369,740 A | 11/1994 | Naylor |
| 5,378,874 A | 1/1995 | Holling et al. |
| 5,412,291 A | 5/1995 | Payne et al. |
| 5,442,344 A | 8/1995 | Merkle et al. |
| 5,442,777 A | 8/1995 | Nakajima et al. |
| 5,471,380 A | 11/1995 | Itami et al. |
| 5,483,200 A | 1/1996 | Okabayashi et al. |
| 5,533,192 A | 7/1996 | Hawley et al. |
| 5,587,795 A | 12/1996 | Williams |
| 5,594,663 A | 1/1997 | Messaros et al. |
| 5,611,327 A | 3/1997 | Teixeira Filho et al. |
| 5,619,614 A | 4/1997 | Payne et al. |
| 5,627,727 A | 5/1997 | Aguilera et al. |
| RE35,566 E | 7/1997 | Boyer et al. |
| 5,647,231 A | 7/1997 | Payne et al. |
| 5,666,274 A | 9/1997 | Corso |
| 5,666,282 A | 9/1997 | Itami et al. |
| 5,685,623 A | 11/1997 | Katz et al. |
| 5,689,168 A | 11/1997 | Bogwicz et al. |
| 5,696,676 A | 12/1997 | Takaba |
| 5,701,187 A | 12/1997 | Uchio et al. |
| 5,710,409 A | 1/1998 | Schwärzbacker et al. |
| 5,711,606 A | 1/1998 | Koether ................ 374/149 |
| 5,723,846 A | 3/1998 | Koether et al. ............ 219/497 |
| 5,726,424 A | 3/1998 | Koether |
| 5,746,114 A | 5/1998 | Harris |
| 5,778,550 A | 7/1998 | Carli et al. |
| 5,784,253 A | 7/1998 | Ooka et al. |
| 5,798,520 A | 8/1998 | Kuijk et al. |
| 5,799,281 A | 8/1998 | Login et al. |
| 5,818,428 A | 10/1998 | Eisenbrandt et al. |
| 5,839,097 A * | 11/1998 | Klausner ................ 340/825.69 |
| 5,861,968 A | 1/1999 | Kerklaan et al. |
| 5,870,035 A | 2/1999 | Bjernulf |
| 5,875,430 A | 2/1999 | Koether |
| 5,889,669 A | 3/1999 | Kagami et al. |
| 5,914,796 A | 6/1999 | Selin |
| 5,963,145 A | 10/1999 | Escobosa |
| 5,987,105 A * | 11/1999 | Jenkins et al. ......... 379/106.01 |
| 6,055,651 A | 4/2000 | Sasaki et al. |
| 6,080,972 A | 6/2000 | May |
| 6,121,593 A | 9/2000 | Mansbery et al. |
| 6,137,095 A | 10/2000 | Kashimoto et al. |
| 6,198,079 B1 | 3/2001 | Essig |
| 6,218,870 B1 | 4/2001 | Wilson |
| 6,227,181 B1 | 5/2001 | Suzuki |
| 6,252,503 B1 | 6/2001 | Berger et al. |
| 6,256,378 B1 | 7/2001 | Iggulden et al. |
| 6,281,481 B1 | 8/2001 | Tiemann |
| 6,292,186 B1 | 9/2001 | Lehman et al. |
| 6,316,758 B1 | 11/2001 | Ubowski et al. |
| 6,324,659 B1 | 11/2001 | Pierro |
| 6,333,801 B1 | 12/2001 | Yoshinaga |
| 6,336,065 B1 | 1/2002 | Gibson et al. |
| 6,338,148 B1 | 1/2002 | Gillenwater et al. |
| 6,338,152 B1 | 1/2002 | Fera et al. |
| 6,346,692 B1 | 2/2002 | Ubowski et al. |
| 6,356,376 B1 | 3/2002 | Tonar et al. |
| 6,369,924 B1 | 4/2002 | Scharf et al. |
| 6,380,866 B1 | 4/2002 | Sizer, II et al. |
| 6,385,497 B1 | 5/2002 | Ogushi et al. |
| 6,389,337 B1 | 5/2002 | Kolls |
| 6,415,023 B2 | 7/2002 | Iggulden |
| 6,437,685 B2 | 8/2002 | Hanaki |
| 6,446,357 B2 | 9/2002 | Woerdehoff et al. |
| 6,449,515 B2 | 9/2002 | Imoto |
| 6,462,328 B2 | 10/2002 | Toyoda |
| 6,466,971 B1 | 10/2002 | Humpleman et al. |
| 6,480,753 B1 | 11/2002 | Calder et al. |
| 6,483,695 B1 | 11/2002 | Hartstein |
| 6,484,274 B1 | 11/2002 | Lee et al. |
| 6,497,368 B1 | 12/2002 | Friend et al. |
| 6,502,133 B1 | 12/2002 | Baulier et al. |
| 6,507,022 B1 | 1/2003 | Salmond et al. |
| 6,528,808 B1 | 3/2003 | Takiguchi |
| 6,530,784 B1 | 3/2003 | Yim et al. |
| 6,717,528 B1 | 4/2004 | Burleson et al. |
| 6,760,688 B2 | 7/2004 | Suzuki et al. |
| 6,812,881 B1 * | 11/2004 | Mullaly et al. ............. 341/176 |
| 6,839,563 B1 | 1/2005 | Kirby et al. |
| 6,919,815 B2 * | 7/2005 | Peterson .................. 340/815.4 |
| 2002/0070846 A1 | 6/2002 | Bastian, II et al. |
| 2002/0105432 A1 | 8/2002 | Pederson et al. |
| 2002/0184385 A1 | 12/2002 | Kato |
| 2002/0190956 A1 | 12/2002 | Klein et al. |

FOREIGN PATENT DOCUMENTS

| | | |
|---|---|---|
| EP | 0 715 235 | 6/1996 |
| GB | 2 343 996 | 5/2000 |
| WO | WO 95/28615 | 10/1995 |
| WO | WO 99/41856 | 8/1999 |
| WO | WO 00/43870 | 7/2000 |

* cited by examiner

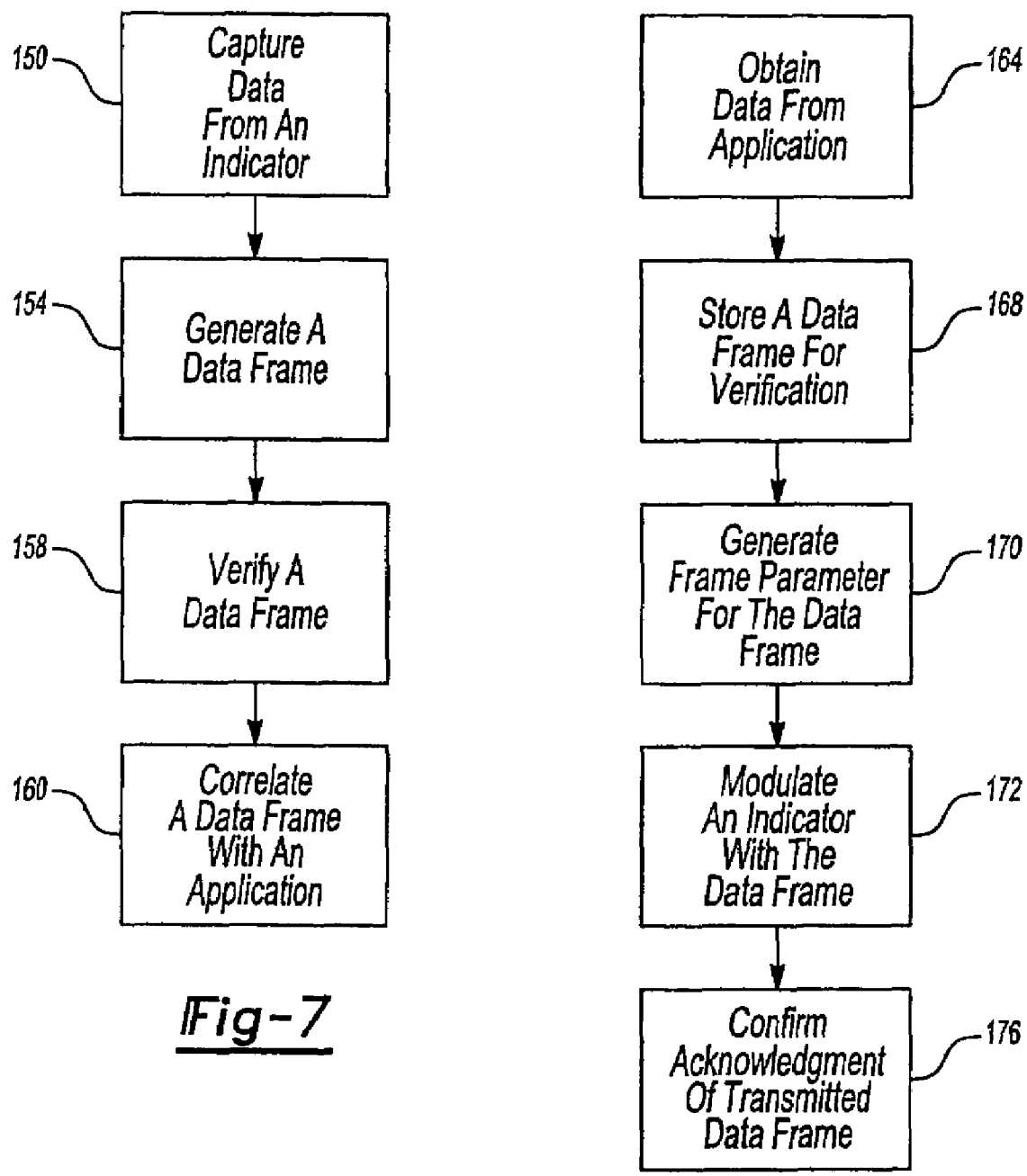

SYSTEM AND METHOD FOR COMMUNICATING WITH AN APPLIANCE THROUGH AN OPTICAL INTERFACE USING A CONTROL PANEL INDICATOR

FIELD OF THE INVENTION

This invention relates to appliance communication methods and, more particularly, to appliance communication methods that use an optical interface.

BACKGROUND OF THE INVENTION

Appliance devices such as dishwashers, clothes washing machines, dryers, ovens, refrigerators and the like often comprised of electromechanical components. Some of these components have knobs or selector switches so a user may control operational parameters of the appliance. In many cases, the overall operation of the appliance is predefined as a general matter and the settings or selections input by a user merely modify the predefined operation in some way.

For example, the operation of a dishwasher typically involves the processes of filling, washing, draining and rinsing. Such operations involve, among other things, the control of water valves, drain valves and motor relays. The general sequence of such operations is generally predefined. However, user input may be used to alter the sequence of operations within a cycle or to define certain parameters for the entire sequence or parameters within an operation of the sequence. For example, the user input may define whether the wash cycle is normal, light, or heavy. Parameters within an operation of sequence include the temperature of the wash or rinse cycle. Although the general sequence of the overall cycle does not necessarily change dependent upon wash cycle selection, the length or parameters of certain operations within the cycle sequence may change.

A typical user input interface for an electromechanical appliance may include a rotary knob and a plurality of pushbutton switches. The rotary knob may be attached to a mechanical timer having a cam that controls the sequence of operations within the appliance. The cam has a number of followers that trigger the operation of the various appliance components. The cam followers are positioned to cause various operations to be executed in a "programmed" sequence. The user selects a particular cycle by rotating the knob to a particular position associated with the selected cycle. Upon actuation, the cam begins to rotate automatically started from the user selected position to trigger each operation as defined on the cam "program" from the user-selected point forward. The pushbutton switches are used to activate/deactivate various options that are not available through the cam activated program. For example, pushbutton switches may be used to selectively activate such features as a heated dry cycle, a delayed start, or a high temperature wash in a dishwasher, for example.

More recently, electronic controllers, for example, microprocessors and microcontrollers, have replaced the rotary cam control device. The use of electronic controllers provides flexibility and features not typically available in cam control devices. Moreover, as a general matter, replacement of moving parts, such as electromechanical rotating cams, typically increases reliability in products. One aspect of electromechanical appliances not available in appliances with electronic controllers is an indication of the operation in a cycle sequence being performed. In electromechanical appliances, the knob by which the cam was set typically included an arrow or other pointer that pointed towards indicia on the control panel adjacent the knob. By looking at the position of the knob and the indicia to which it pointed, the user could ascertain the operation being performed by the appliance.

To provide an indication of the operation being performed, many appliances having electronic controllers also include indicators such as small electrical lights or light emitting diodes (LEDs). These indicators are typically located adjacent indicia on an appliance control panel. As the electronic controller deactivates one operation and activates another, the controller also operates one or more switches to turn off the indicator beside indicia identifying the operation being deactivated and turning on the indicator beside indicia identifying the operation being activated. In this manner, the user is provided visual feedback regarding the current operational state of the appliance.

The use of electronic controllers has added to the complexity of servicing appliances. Small electronic integrated circuits do not lend themselves to the methods of troubleshooting and repair that have historically been used with mechanical and electromechanical devices. Accordingly, malfunctions in an electronically controlled appliance are more difficult to diagnose and resolve than those of the old, mechanical cam controlled devices.

Some have proposed the incorporation of infrared and radio communication devices in appliances having microprocessors for the purpose of communicating troubleshooting data. However, infrared and radio communication modules add appreciable expense to the manufacture of appliances. Because appliance manufacturers operate with relatively low profit margins, an increase of even one dollar in cost is multiplied by the production output, which may be in the millions of units. Thus, the additional expense of long range communication modules, such as infrared and radio communication devices, may significantly impact the bottom line of an appliance manufacturer.

In an effort to provide a low cost communication interface for an appliance having an electronic controller, the assignee of the present invention has developed an optical communication interface that effectively uses the indicators of the appliance for communication. This optical communication interface is the subject of pending U.S. patent applications bearing Ser. Nos., 10/264,888 filed Oct. 4, 2002, and 10/348, 305 filed Jan. 21, 2003, that are entitled "Appliance Control Communication Methods and Apparatus," and "System and Method for Communicating with an Appliance Through a Light Emitting Diode," respectively. These applications are hereby expressly incorporated by reference. As set forth in these applications, an electronic controller may control the on/off status of an indicator to provide a digital optical signal that may be received by an externally located phototransistor or other LED. The digital signal from the appliance may be used to provide data from the appliance to external data storage for analysis or transmission. Additionally, an external device may transmit a signal to the appliance in a reverse manner because a LED used as an indicator on an appliance may respond as a phototransistor to light and generate a corresponding electrical signal. This signal may be received by the electronic controller and used to modify data or program control within the appliance.

While the optical interface may support communication with an electronic controller so data may be exchanged with an appliance, data communication problems also arise in the management of the interface and the communication received through it. One problem that arises regards the amount of resources to allocate to the management of the communication interface. In most electronic controllers used in appliances, program and data memory space are typically at a premium. Consequently, communication management of the interface needs to be efficient. Another problem with management of the interface in an appliance is the validity of the data. That is, the controller and the external device need to determine whether data received is the data that was transmitted. Furthermore, the electronic controller needs to be able to determine whether all data elements of a data message have been received.

While network protocols are available that provide data message verification and that assess whether complete messages have been received, such protocols and programs that implement them are not good candidates for optical interface control in an appliance. For one, they require a lot of memory resources. For another, they assume the coupling of a device to a network with each device having an unique identifier. The processing of the identifier and forwarding of messages not addressed to the recipient requires overhead processing and resources that may not be available in an appliance.

Consequently, there is a need for communication management in an appliance without significantly increasing the costs of manufacturing an appliance.

There is a need for communication management that does not require a fully orbed network communication controller and program.

SUMMARY OF THE INVENTION

The above noted deficiencies of previously existing communication management programs are addressed by a system made in accordance with the principles of the present invention. The system includes a physical layer for communicating data streams between two computers through at least one indicator of a control panel for operating an apparatus; a framing layer within one of the two computers, the framing layer for communicating data streams with the physical layer and for generating frames having a frame start delimiter and a frame stop delimiter; a transport layer for verifying frames communicated with the framing layer; and a dispatch layer for correlating a verified frame with an application executing within the apparatus so that a frame may be communicated between the dispatch layer and the correlated application. These elements in the system of the present invention provide control over the indicator, recognition of data message completeness, and correlation of a data message with an application program within a controller so the data message may be processed by the appropriate application.

In a preferred implementation of the present invention, the physical layer is a universal asynchronous receiver/transmitter (UART) that is coupled to the indicator. The UART, under control of the electronic controller, provides a data signal to the indicator so the indicator is modulated in accordance with the data signal. The use of a UART or equivalent device enables the controller to modulate the indicator without requiring the electronic controller to time each bit of the data signal to the indicator. The UART or equivalent device implementing the physical layer may also receive a data signal from a phototransistor or a LED responding to an optical signal being transmitted by an external device. The signal is processed by the UART and made available to the controller, preferably on a byte by byte or word by word basis.

The framing layer of the present invention includes a frame character comparator for detecting the beginning and ending of data frames. In response to detection of a frame delimiter character, the framing layer may generate a signal for the transport layer to identify whether a complete data frame is available for verification or whether reception of a data frame has begun. The framing layer detects the presence of a special character in a data frame so it may determine whether a frame delimiter character or an escape character is being included in the data frame as character data. Preferably, the framing layer makes this determination by detecting the special character and then comparing the next data message character in the current data frame to a frame delimiter character and a special character to ascertain whether the next character specifies a frame delimiter character or a special character. If the next character following a special character is a frame delimiter character then a frame delimiter character is stored in the data frame. If a special character is followed by a special character, then a special character is included in the data frame as character data. Preferably, the special character is a "D7" hexadecimal character and the frame delimiter character is a "C0" hexadecimal character, although other values may be used for these two characters. Thus, a "D7 C0" sequence denotes a frame delimiter character, "C0," is stored in the data frame while a "D7 D7" sequence denotes an escape character, "D7," is stored in the data frame. In response to detection of a frame delimiter character that is not preceded by the special character, the framing layer determines whether a start or an end of frame is occurring. If an end of frame is detected, the framing layer signals the transport layer so verification of a data frame may commence.

The transport layer includes a verification code generator that generates a verification code as characters are stored in the data frame buffer. In response to a signal from the framing layer that a complete data frame has been received, the transport layer compares the verification code generated for a data frame with the verification code stored within the data frame. If the verification codes correspond to one another, data frame reception is verified. Preferably, the verification code is a cyclic redundancy code (CRC).

The transport layer may also compare the sequence number of the data frame with an expected sequence number. If the sequence number stored in the frame corresponds with the expected sequence number then a data frame has not been missed in the transmission between the appliance and some external device. If the sequence numbers do not correspond then a data frame has been missed. The transport layer then signals that an error has occurred during data transmission so exception processing may be performed.

The transport layer preferably includes an expiration timer and a retry counter that are used by the layer to determine whether a transmitted data frame has been received by the transport layer in the external device. Upon delivery of a data frame to the framing layer for transmission, the transport layer sets an expiration timer. If the timer expires before an acknowledgement message having the sequence number of the last transmitted data frame is verified by the transport layer, then the transport layer compares the retry counter to an error threshold. If the retry counter does not equal the error threshold, the transport layer resends the last transmitted data frame, resets the expiration timer, and increments the retry counter. If the transport layer does not verify an acknowledgement frame before the retry counter equals the error threshold, exception processing occurs. For data frames that the transport layer receives and verifies from an external device, the transport layer generates an acknowledgement data frame having the same sequence number as the verified data frame.

The transport layer also generates a message timeout signal for the dispatch layer so the dispatch layer may inform the application awaiting the data frame that the frame has not been received. If the data frame is verified and the sequence number corresponds to the expected sequence number then the transport layer provides a signal to the dispatch layer that the data frame is available for processing by its corresponding application. The dispatch layer preferably includes a registered callback function to identify the application corresponding to a data frame and notifies the application that a data frame is available for processing.

For a data stream sent by the appliance to an external device, the transport layer generates a verification code that is stored with the data buffer for an outgoing data frame. The transport layer also sets the sequence number within the data frame to properly identify the data frame. For transmissions, the framing layer adds a frame delimiter character to the beginning and end of the data frame before providing the data frame to the physical layer for transmission. It also checks to determine if a frame delimiter character or a special character is within a data frame. If either character is part of the data within a data frame, the character is preceded by a special character in the data frame so the receiving device is able to determine the presence of a frame delimiter character or special character within the data frame.

An electronic controller implementing the principles of the present invention preferably includes a usage data application for obtaining appliance usage data and providing it to the transport layer through the dispatch layer for framing and generation of the data signal to modulate the indicator. Also, the controller preferably includes an identification data application for providing appliance identification data for transmission through the indicator. In another preferred embodiment, the appliance includes an error data memory for storing error data. The error data memory is not initialized during a system reset so the error data stored before a system shutdown is not wiped out by initialization data or memory testing. The controller includes an operating error application that senses an imminent shutdown and stores error data regarding the status of the controller in the error data memory so it remains available for transmission after the system is reset. Alternatively, the controller may include an application that analyzes the data in this error section that is not reset by a power down condition.

A method operating in accordance with the principles of the present invention may also be used to overcome the limitations of previously known appliance communication interfaces. The method includes communicating data streams between two computers through at least one indicator of a control panel for operating an apparatus; generating frames from one of the data streams having a frame start delimiter and a frame stop delimiter; verifying frames generated from a data stream; and correlating a verified frame with an application executing with the apparatus. This method operates to provide data frames to and from one or more indicators for communication with an external device as well as to manage the communication of data frames through an optical interface implemented through one or more indicators on an appliance.

The system and method of the present invention provide effective communication management in an appliance without significantly increasing the costs of manufacturing an appliance.

The system and method of the present invention provides effective communication management without a fully orbed network communication controller and program.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various components and arrangement of components and in various methods. The drawings are only for purposes of illustrating exemplary embodiments and alternatives and are not to be construed as limiting the invention.

FIG. 7 is a flow diagram of an exemplary process implementing communication management for data frame reception in an appliance having an optical interface;

FIG. 8 is a flow diagram of an exemplary process implementing communication management for data frame transmission in an appliance having an optical interface;

DETAILED DESCRIPTION OF THE INVENTION

Figure 1:
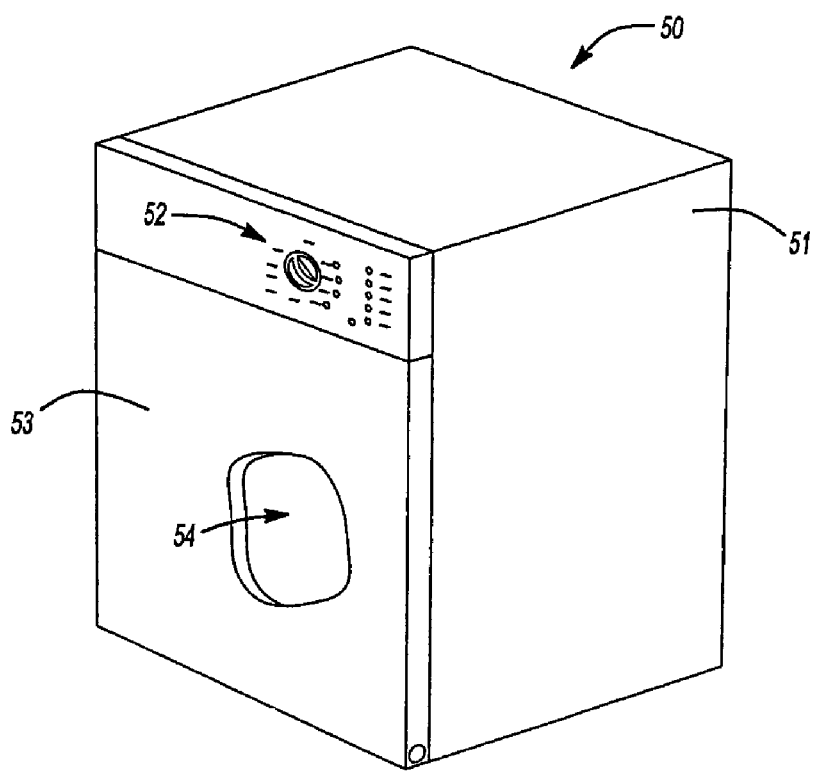
FIG. 1 shows a perspective, partially cutaway view of an exemplary dishwasher in which one or more features of the present invention may be incorporated.

FIG. 1 shows an exemplary embodiment of a dishwasher 50 in which one or more aspects of the present invention may be incorporated. Dishwasher 50 includes a frame 51, a control panel 52, a door 53, and a tub 54. Door 53 is pivotally attached to frame 51. Door 53 and frame 51 define an enclosure in which is located tub 54. Control panel 52 is affixed to frame 51. The enclosure formed by door 53 and frame 51 also houses control circuits and devices as is known in the art. The exact physical arrangements of door 53, frame 51 and tub 54 are a matter of design choice. For example, control panel 52 may be mounted on door 53 in some embodiments.

Figure 2:
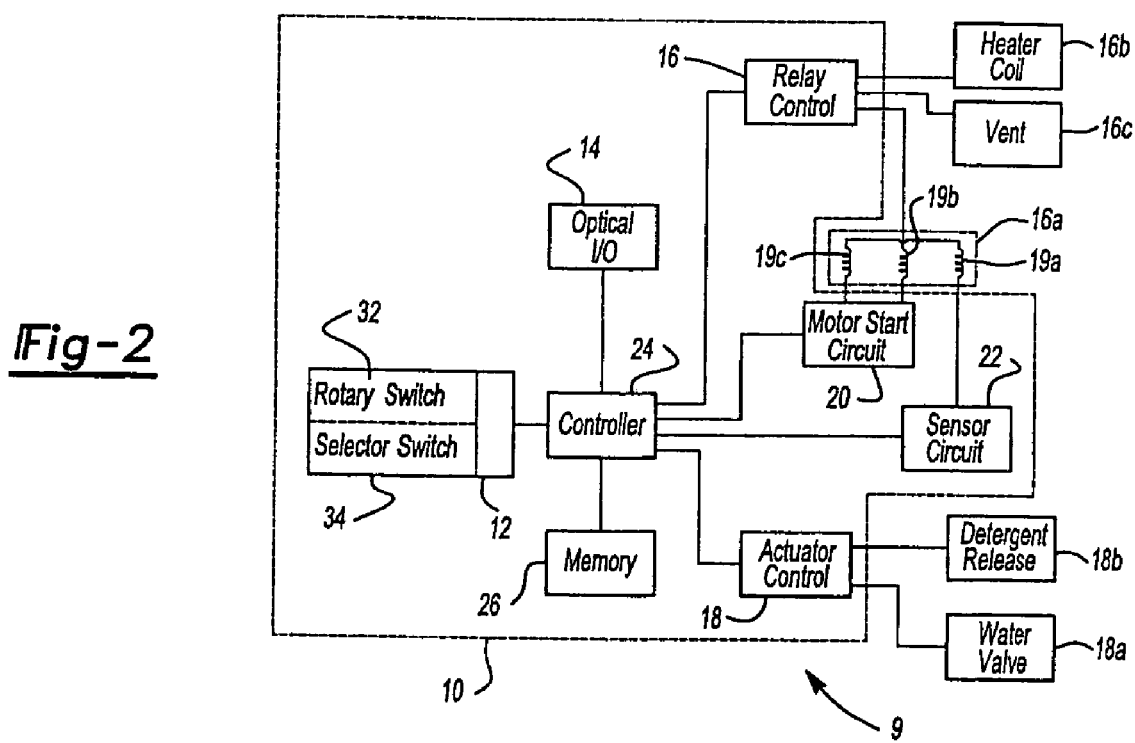
FIG. 2 shows a schematic block diagram of an exemplary appliance circuit that incorporates one or more features of the present invention.

FIG. 2 shows a schematic block diagram of an exemplary appliance circuit 9 that incorporates one or more features of the present invention. Appliance circuit 9 includes a control circuit 10 and a set of electromechanical devices. In the exemplary embodiment described herein, the electromechanical devices include a motor 16a, a heater coil 16b, a vent 16c, a water valve solenoid 18a, and a detergent release actuator 18b. Such electromechanical devices are arranged within the frame and/or tub of a dishwasher such as dishwasher 50 of FIG. 1 with other mechanical devices such as pumps, rotating water sprayers, dish racks and the like as is well known in the art. The exact arrangement of the electromechanical devices and mechanical devices is a matter of design choice.

Appliance control circuit 10 controls the operation of one or more of the electromechanical devices as to carry out one or more appliance operations. In the exemplary embodiment described herein, appliance control circuit 10 controls the operation of the devices that cooperate to perform dishwashing operations. However, it will be appreciated that the principles of the present invention may readily be adapted for use in clothes washing machines, clothes dryers, as well as other appliance devices.

Dishwasher control circuit 10 of FIG. 1 includes a switch input circuit 12, an optical input/output ("I/O") circuit 14, a relay control circuit 16, a valve control circuit 18, a motor start circuit 20, a sensor circuit 22, a controller 24, and a memory 26.

Switch input circuit 12 includes a rotating position switch 32 and a selector switch 34. In accordance with the present invention, rotating position switch 34 has a first position associated with a first appliance function. For example, the first position may be a position in which a first washing cycle is selected from a plurality of possible washing cycles. In accordance with one aspect of the present invention, rotating position switch 32 further includes a second position associated with a second appliance function, the second appliance function modifying the first appliance function. For example, the second position may select from one or more user options, such as delayed start, a forced air drying cycle, or the like. Selector switch 34 is a switch that may be manipulated to an actuated state. Selector switch 34 in the actuated state is configured to generate a signal representative of a selection of the first appliance function when the rotating position switch is in the first position. Selector switch 34 in the actuated state is further configured to generate a signal representative of a selection of the second appliance function when the rotating position switch is in the second position.

Rotating position switch 32 and selector switch 34 may take a variety of forms. In general, rotating position switch 32 includes a plurality of rotational positions in which user cycle selections may be identified by the user or operator, and selector switch 34 is a device that actually causes an input signal based on the user selection to be communicated to controller 24.

Optical I/O circuit 14 includes at least first and second optical communication devices, not shown in FIG. 2 (see, e.g., FIG. 3), that are in communication with an external surface of the appliance control panel. The first and second optical communication devices operate to communicate information between controller 24 and an external device. In preferred embodiments, optical I/O circuit 14 further includes a plurality of indicators that communicate information regarding the operation of the dishwasher to the human operator when the appliance is being conventionally used. Circuit 14 also includes a UART, such as the M30620 microcontroller peripheral UART manufactured by Mitsubishi of Japan so at least one indicator may be modulated with data received from controller 24 for communication with an external device. Additionally, the UART may receive a data signal from an external device through an indicator and deliver a data unit to controller 24 for further processing.

Relay control circuit 16 is a circuit that is configured to control the status of various relay contacts in accordance with control signals received from controller 24. The relays may operate to activate and deactivate various appliance mechanisms, for example, motor 16a, heater coil 16b, and vent fan 16c in a known manner.

Actuator control circuit 18 is a circuit that is configured to control the operation of one or more actuators in the dishwasher in accordance with signals received from controller 24. In the exemplary embodiment described herein, actuator control circuit 18 is configured to control the operation of a water valve solenoid 18a, and a detergent release mechanism 18b.

Motor start circuit 20 is a circuit that is configured to control start windings 19b and 19c of the motor 16a. In accordance with one aspect of the present invention, motor start circuit 20 includes a current sense circuit that is coupled to run winding 19a of appliance motor 16a. The current sense circuit includes a sense resistor that is formed as an etched trace in a printed circuit board. The etched trace has a geometry that defines a resistance of the sense resistor. The current sense circuit, among other things, provides a mechanism by which information regarding the motor winding current may be obtained. Such information may be used for many purposes. For example, the motor winding current information may be used by controller 24 to determine when to activate and de-activate start windings 19b and 19c in motor 16a. However, controller 24 may also use the information from the current sense circuit to adjust water levels.

Sensor circuit 22 is a circuit that is configured to provide to the controller 24 electrical signals representative of a sensed condition of the dishwasher operation. For example, sensor circuit 22 in the exemplary embodiment described herein includes a temperature sensor, a soil sensor, and a motor current sensor.

Controller 24 is a processor-based control circuit that is operable to provide control signals to relay control circuit 16, actuator control circuit 18, and motor start circuit 20, responsive to input signals received from switch input circuit 12 and sensor circuit 22. Controller 24 may suitably include a microprocessor, a microcontroller, and/or other digital and analog control circuitry as well as incidental circuitry associated therewith. Controller 24 is preferably configured to perform operations based on program instructions stored in memory 26 and/or memory internal to controller 24. Controller 24 may be a general purpose microcontroller or microprocessor, such as a M30620 manufactured by Mitsubishi of Japan that executes a program stored in memory 26 to perform the control operations required for operation of an appliance. Alternatively, controller 24 may be an application specific integrated chip (ASIC) that may execute a control program stored internally in the ASIC.

Memory 26 comprises one or more electronic memory devices which may suitably include a read only memory, a random access memory ("RAM"), an electronically erasable programmable read only memory ("EEPROM"), other types of memory, or a combination of any of the above. In a preferred embodiment, memory 26 includes a programmable non-volatile memory, for example, an EEPROM. Typical resources for common household appliances include 4 KB of RAM for data storage and 2 KB of EEPROM for program and persistent data storage.

In the general operation of dishwasher control circuit 10, an operator typically provides as input a first input signal representative of a select cycle operation of the dishwasher via switch input circuit 12. For example, the first input signal may be one that corresponds to a request for a full wash cycle. The operator may also provide as a second input via switch input circuit 12 a second input signal representative of an operation modification option, such as, for example, an additional heated dry cycle, or a delayed start. Most appliances, including dishwashers, clothes washing machine, clothes dryers and the like haves commonly featured a main cycle selection that may be modified by one or more separate option selections.

In any event, controller 24 receives the first input signal and, if applicable, the second input signal, and commences a dishwashing operation accordingly. In a typical wash cycle, the general cycle is as follows: 1) water fill, 2) spray water, 3) release detergent, 4) spray water, 5) drain water, 6) water fill, 7) spray water, and 8) drain water. It will be appreciated that the above cycle may readily be modified or altered as is known in the art.

Figure 3:
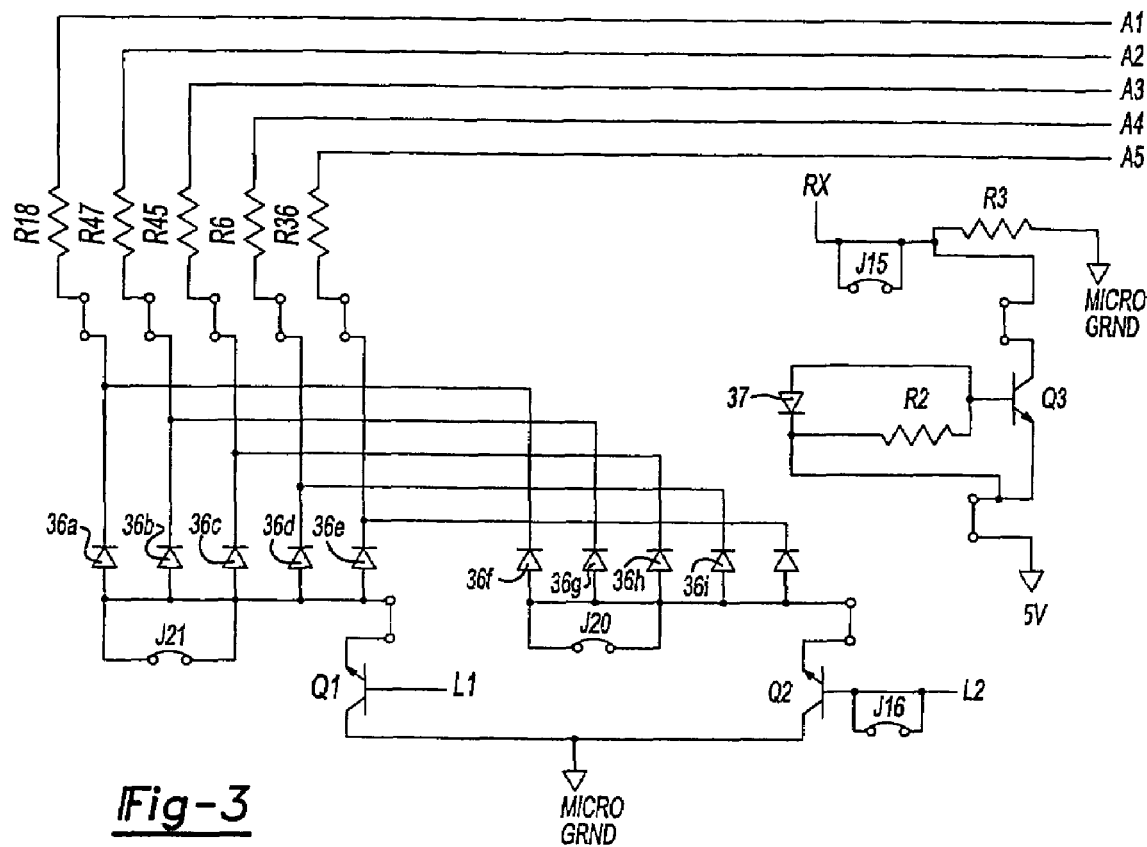
FIG. 3 shows a schematic diagram of a portion of the optical I/O circuit shown in FIG. 2.

FIG. 3 shows a schematic diagram of the portion of the exemplary control circuit that includes the optical I/O circuit 14. The optical I/O circuit 14 includes a plurality of indicators 36a through 36i which in the exemplary embodiment described herein are light emitting diodes ("LEDs"). The optical I/O circuit 14 further includes an optical detector device 37 in the form of a detector LED.

In general, indicators 36a through 36i are operably connected to microcontroller U1. Microcontroller U1 controllably energizes indicators 36a through 36i at select times during the operation of the dishwasher. During conventional operation of an appliance, microcontroller U1 energizes indicators 36a through 36i in response to operator selections. Microcontroller U1 also energizes indicators 36e through 36i to indicate various phases of an operational cycle that correspond to indicia located adjacent to lights 36e through 36i.

In the exemplary embodiment described herein, indicators 36a through 36i are connected to the microcontroller U1 in the manner described below. A first LED driver transistor Q1 is connected between a microcontroller output L1 and the anodes of each of indicators 36a through 36e. A second LED driver transistor Q2 is connected between a microcontroller output L2 and the anodes of each of indicators 36f through 36i. The cathodes of indicators 36a and 36f are coupled through a 220 ohm resistor R18 to an A1 output of microcontroller U1. The cathodes of indicators 36b and 36g are coupled through a 220 ohm resistor R47 to an A2 output of microcontroller U1. The cathodes of indicators 36c and 36h are coupled through a 220 ohm resistor R45 to an A3 output of the microcontroller U1. The cathodes of indicators 36d and 36i are coupled through a 220 ohm resistor R6 to an A4 output of microcontroller U1. The cathode of indicator 36e is coupled through a 220 ohm resistor R36 to an A5 output of the microcontroller U1.

Accordingly, microcontroller U1 energizes each indicator 36x by providing an output signal on a unique combination of either L1 or L2 and one of A1, A2, A3, A4 and A5. For example, to energize the indicator light 36h, microcontroller U1 energizes both L2 and A3.

The optical interface used with the present invention includes a physical layer 84 that may be implemented in part with UART 90. The transmitter output of UART 90 may wired OR'd or multiplexed to the base of transistor Q1 to modulate one of the indicators 36a to 36e with a data signal. The indicator is selected by microcontroller U1 activating one of the lines A1 to A5. Data may be received by a LED especially configured for data reception as shown at indicator 37. Optical detector 37 is coupled through an amplifier transistor Q3 to an RX input of microcontroller U1. In particular, the anode of optical detector 37 is connected to the base of transistor Q3, which is an NPN bipolar junction transistor. The cathode of optical detector 37 is coupled to a bias voltage supply (−5V). A 220 k-ohm bias transistor R2 is further coupled between the bias voltage supply and the base of transistor Q3. The collector of transistor Q3 is coupled to ground through a 47 k-ohm bias resistor R3. The RX input of microcontroller U1 is coupled to the collector of transistor Q3. The collector of transistor Q3 is coupled to the bias voltage supply (−5V). In this configuration, the collector of Q3 is coupled to the receive line of UART 90 so modulation of indicator 37 by an external light source causes a data signal to arrive at the receiver input of UART 90.

Alternatively, one of the other indicators not being used for transmission may be used for data reception. This indicator is configured as shown for LED 37. Preferably, one of the indicators 36f to 36i is chosen to simplify the reception control. Specifically, the cathode of the selected indicator is coupled to Q2 as well as being coupled to the base of transistor Q3 as shown for indicator 37. The emitter of Q3 is coupled to −5V through a switch that is under the control of microcontroller U1. Thus, microcontroller U1 may select an indicator for conventional operation as described above. During communication mode, Q2 is not activated by microcontroller U1 so the indicator does not respond as it does in the operational mode. Instead, the switch that couples the emitter of Q3 to −5V is activated so the LED responds to light impinging on it. Again, the modulation of the LED by an external light source selectively turns Q3 on and off to generate a corresponding data signal at the collector of Q3 that is received at the receiver input of UART 90. This signal may then be provided to framing layer 78 for further processing.

Figure 4:
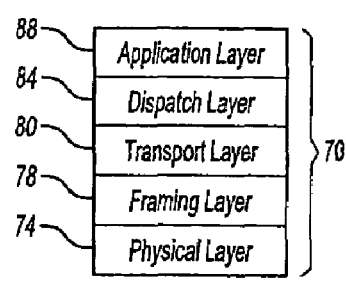
FIG. 4 is a block diagram of the layer structure of a communication management module made in accordance with the principles of the present invention.

In an embodiment of the present invention, a portion of the program executed by controller 24 includes a communication management module 70, shown in FIG. 4, having a physical layer 74, a framing layer 78, a transport layer 80, a dispatch layer 84, and an application layer 88. As explained in more detail below, each of these layers performs a function in the management of data communication through circuit 14 so each application in the application layer need not include components for communication processing.

Figure 5:
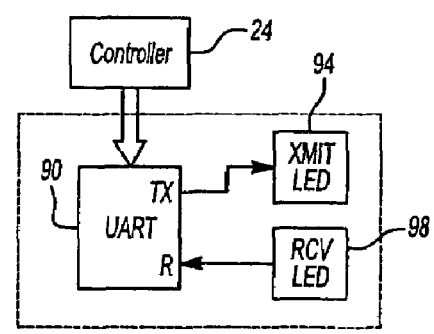
FIG. 5 is a block diagram of the optical I/O circuitry using an exemplary UART to implement a portion of the physical layer.

In a preferred implementation of the present invention, the physical layer is a universal asynchronous receiver/transmitter (UART) that is a component of optical I/O circuit 14 for communication with one or more of the indicators for external communication. As shown in FIG. 5, UART 90 is coupled to controller 24 for communication with controller 24 in a parallel manner while UART 90 is coupled to a transmitter indicator 94 and a receiver indicator 98 for the communication of data in a serial manner. UART 90, under control of controller 24, provides a data signal to a transmitter indicator 94 so the indicator is modulated in accordance with the data signal. The use of a UART or equivalent device enables controller 24 to modulate indicator 94 without requiring the electronic controller to time each bit of the data signal to the indicator. The UART or equivalent device implementing the physical layer may also receive a data signal from a phototransistor or receiver LED 98 responding to an optical signal being transmitted by an external device. The signal is processed by UART 90 and made available to controller 24, preferably on a byte by byte or word by word basis. That is, controller 24 provides data to UART 90 in a parallel byte or word format on a data bus. UART 90 then shifts the bits of the byte or word out in a serial manner to modulate selected transmitter indicator 94 to which UART 90 is coupled. In like manner, a receiver indicator 98 stimulated by light pulses generates a serial electrical signal that UART 90 converts into a data byte or word. The UART then signals controller 24 that a byte or word is ready via interrupt. Alternatively, the UART may be polled for data.

Figure 6:
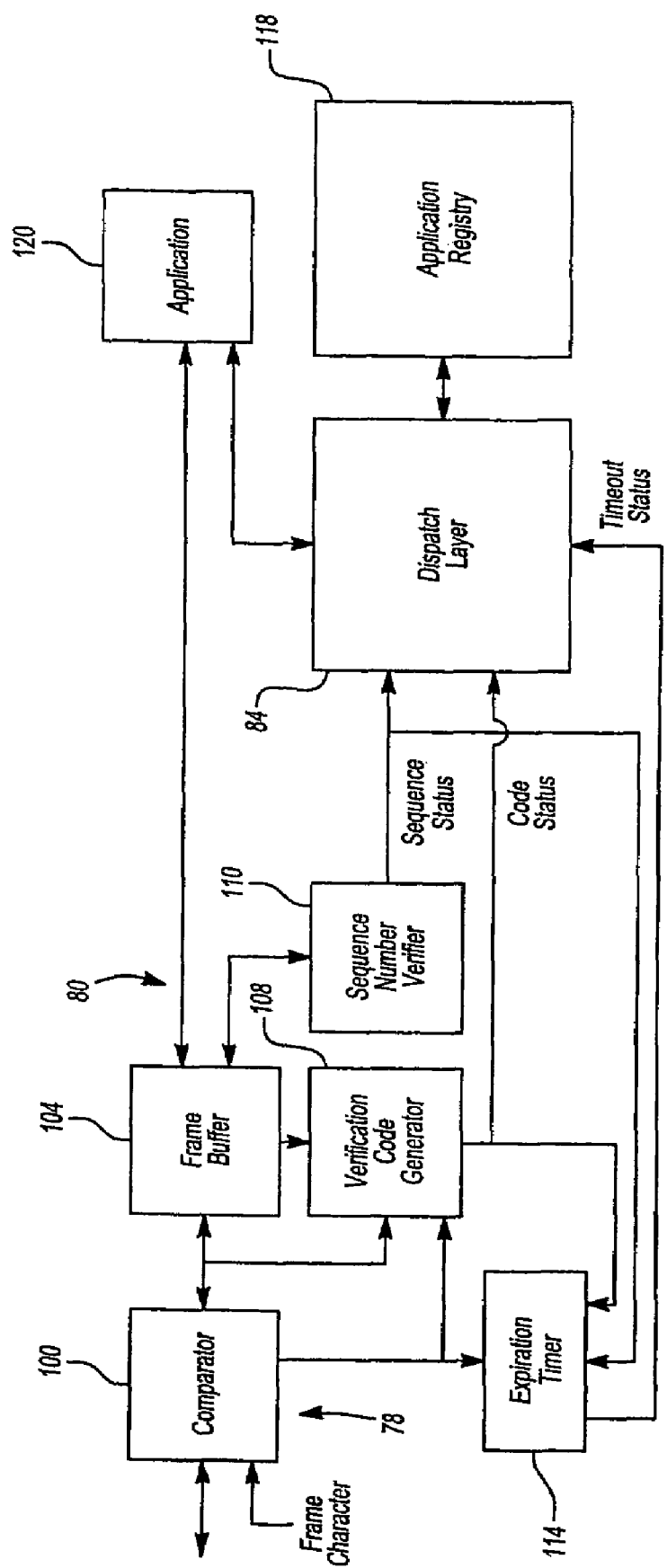
FIG. 6 is a block diagram of the components comprising the framing, transport, and dispatch layers of the communication module shown in FIG. 4.

The interaction of framing layer 78, transport layer 80, and dispatch layer 84 is shown in FIG. 6. Framing layer 78 of the present invention preferably implements the serial link internet protocol (SLIP) to verify frame integrity, although other protocols may be used without departing from the principles of the present invention. Framing layer 78 includes a frame character comparator 100 for receiving data units from physical layer 74 and detecting the beginning and ending of data frames. In response to detection of a start frame delimiter character, comparator stores the data unit into frame buffer 104 and continues thereafter to store data units in frame buffer 104 until an end of frame delimiter character is detected or buffer overflow occurs. Frame buffer 104 is comprised of a portion of memory 26. Verification code generator 108 also receives a data unit or character from comparator 100 for the computation of the verification code. A signal from comparator 100 indicates the start and end of a data frame so verification code generator 108 of transport layer 80 may initialize and commence its verification code generation or determine whether a complete data frame is available for verification.

Comparator 100 of framing layer 78 also determines whether a character received from physical layer 74 is a special character indicates whether a frame delimiter character or a special character is actually part of a data frame as a character. Preferably, comparator 100 of framing layer 78 makes this determination by holding the special character until it compares the next data message character in the current data frame to ascertain whether the next character is a frame delimiter character or a special character. If it is one of those two characters, then a frame delimiter character or special character is actually part of the data frame. Consequently, a frame delimiter character or special character, depending upon which type followed the initial special character, is stored in the buffer in which the data frame is being stored. By processing data characters as they are being received rather than waiting until all the characters of a frame have been stored in the data frame, memory space is conserved because the data frame need not be transferred from the frame buffer to an additional frame processing buffer so the frame buffer remains available for data reception. Additionally, processing time is conserved because the transport layer need not review every byte or word in a data frame to determine whether a special character double byte situation exists.

Transport layer 80 includes a verification code generator 108 that generates a verification code as characters are stored in data frame buffer 104. In response to a signal from comparator 100 of framing layer 78 that a complete data frame has been received, verification code generator 108 compares the verification code generated for a data frame with the verification code stored within data frame buffer 104. If the verification codes correspond to one another, a data frame reception status is generated for dispatch layer 84. Preferably, the verification code is a cyclic redundancy code (CRC).

Transport layer 80 may also include a sequence number comparator 110 that compares the sequence number of the data frame stored in buffer 104 with an expected sequence number. If the sequence number stored in the data frame corresponds with the expected sequence number then a sequence status signal is generated that indicates a data frame has not been missed in the transmission between the appliance and some external device. If the sequence numbers do not correspond then a data frame has been missed. Sequence number verifier 110 of transport layer 80 then generates a sequence status signal that indicates an error has occurred during data transmission so exception processing may be performed.

Transport layer 80 preferably includes an expiration timer 114 that is initiated by the transfer of a data frame to the physical layer for transmission. If timer 114 expires before framing layer 78 generates a verified code status signal and a sequence verified signal for an acknowledgement message having the same sequence number as the last transmitted data frame, then the last data frame is retransmitted, a retry counter is incremented, and the expiration timer is reset. If the retry counter equals an error threshold before a verified acknowledgement message having a sequence number that corresponds to the last transmitted data frame is received, then timer 114 generates a timeout status signal. Exception processing occurs in response to receipt of the timeout status signal.

If a data frame is received and verified from an external device, then transport layer 80 provides a signal to dispatch layer 84 that a data frame is available for processing by its corresponding application 120. Dispatch layer includes a registered callback function, represented by application registry in FIG. 5, that identifies an application 120 corresponding to a data frame and that notifies application 120 that a data frame is available for processing.

For a data frame sent by the appliance to an external device, application 120 registers with dispatch layer 84 so the expected response may be provided to the application when it is received. The application stores the data in frame buffer 104 where sequence verifier 110 generates and stores the next message sequence number. Sequence number verifier 110 also increments the sequence number for the expected response. Verification code generator 108 generates the verification code as data units of the data frame are transferred to comparator 100. Comparator 100 appends a start frame and end of frame to the data frame as it transfers the data frame to physical layer 74. Verification code generator adds the verification code to the data frame being transferred to comparator 100 as the last byte or word of the data frame is sent to comparator 100. When comparator 100 transfers the end of frame delimiter to physical layer 74, it signals expiration timer 114 to initiate its timing operation. If timer 114 generates a timeout status signal because an acknowledgement message corresponding to the last transmitted data frame is not received before timer 114 expires and retry counter 114a is exhausted, a timeout signal is generated so exception processing may be performed. Also, dispatch layer 84 may consult with application registry 118 to determine which application 120 was awaiting the response data frame. Dispatch layer 84 may then notify application 120 that an acknowledgement data frame was not received during the expected response period. Otherwise, processing of a response data frame occurs as discussed above.

In a preferred implementation of the present invention, application layer 88 includes a usage data application for obtaining appliance usage data and providing it to the transport layer through the dispatch layer for framing and generation of the data signal to modulate the indicator. Also, the controller preferably includes an identification data application for providing appliance identification data for transmission through the indicator. In another preferred embodiment, the appliance includes an error data memory for storing error data. The error data memory is a portion of memory 26 that is not initialized during a system reset so the error data stored before a system shutdown is not wiped out by initialization data or memory testing. The controller includes an operating error application that senses an imminent shutdown and stores error data regarding the status of the controller in the error data memory so it remains available for transmission after the system is reset. Alternatively, the controller may also include an application that analyzes the error data stored in the error data memory to evaluate the cause of the shutdown.

A method for delivering a data frame from an optical interface using a low intensity indicator to an application is shown in FIG. 7. The method includes capturing data from an indicator of an optical interface (block 150) and generating a data frame (block 154). The data frame is verified (block 158), as described more fully below, and correlated with an application for processing (block 160). A method for delivering a data frame from an application within application layer 88 to an external device through an indicator, shown in FIG. 8, includes obtaining data for a data frame from an application (block 164). The data are then transferred to data frame buffer 104 (block 168) and frame parameters are generated for the data frame (block 170), as described more fully below. The data frame is then used to modulate an indicator for communication with an external device (block 172) and the process determines whether an acknowledgement message is received from the external device for the last transmitted data frame (block 176).

Figure 9:
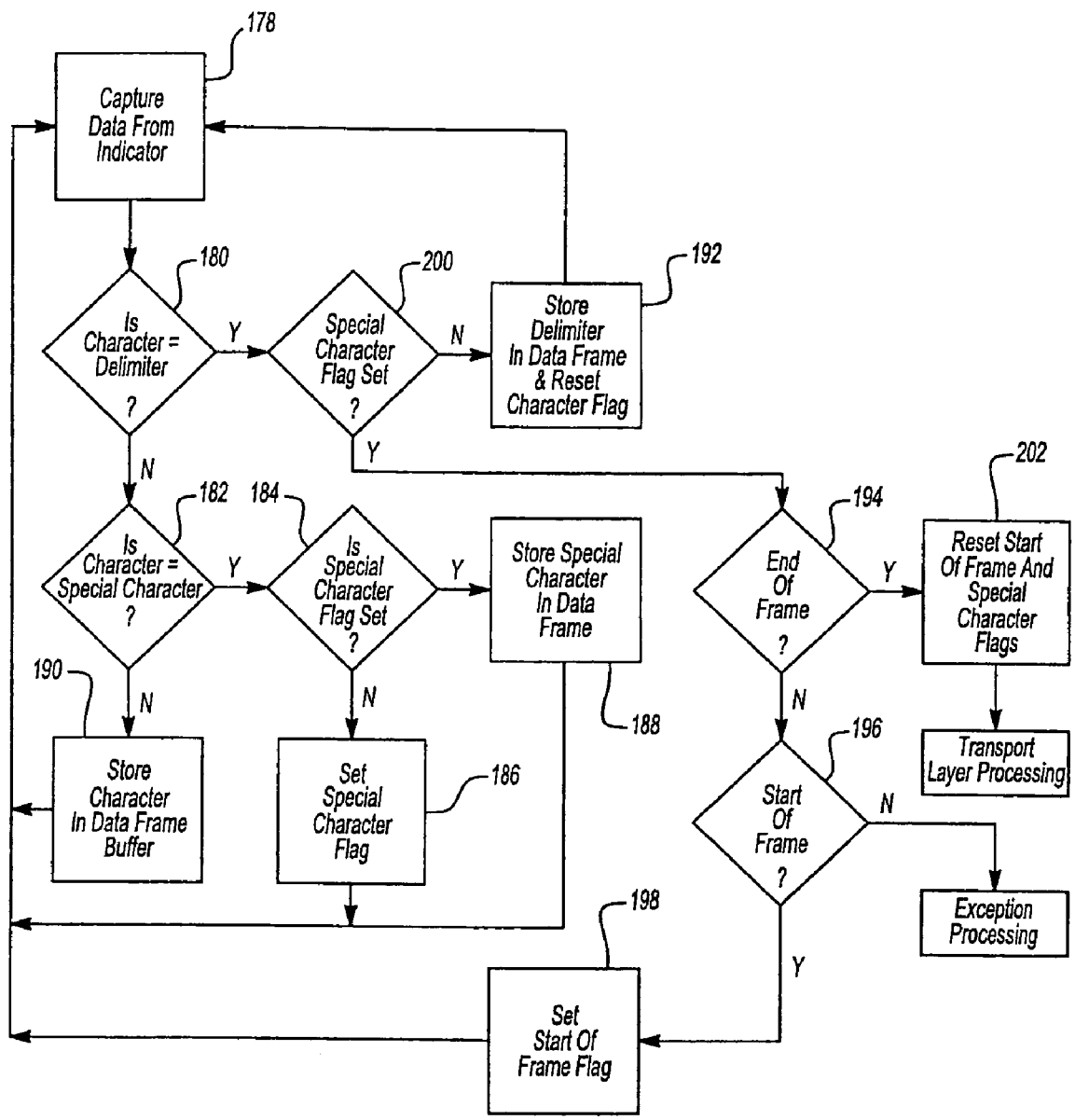
FIG. 9 is a flow diagram of an exemplary process implementing a portion of the framing layer in a communication module.

The method of delivering a data frame to an application is shown in more detail in FIG. 9. The process includes capturing a data character from an appliance indicator (block 178). The character is evaluated to determine whether it is a frame delimiter character (block 180). If it is not a frame delimiter, the process determines whether the character is a special character (block 182). If it is, the process determines whether the special character flag is set (block 184). If it has not been set then it is set (block 186). If it is set, then special character sequence processing is occurring so the special character is stored in data frame buffer 104 (block 188). If the character is neither a delimiter nor a special character, it is stored in data frame buffer 104 (block 190).

If the character is a frame delimiter character (block 180) then the process determines whether the special character flag has been set (block 200). If it has been set, then a special character sequence is being processed so the delimiter is stored in data frame buffer 104 and the special character flag is reset (block 192). Otherwise, the delimiter marks the start or end of a frame. The end of frame is tested (block 194) and, if active, the start of frame and special character flags are reset before the data frame is provided to the transport layer for further processing. If the delimiter does not indicate an end of frame, a start of frame condition is tested (block 196). If the delimiter indicates a start of frame, the frame start flag is set (block 198) and processing of subsequent characters continues (block 180). Otherwise, exception processing is performed.

Figure 10:
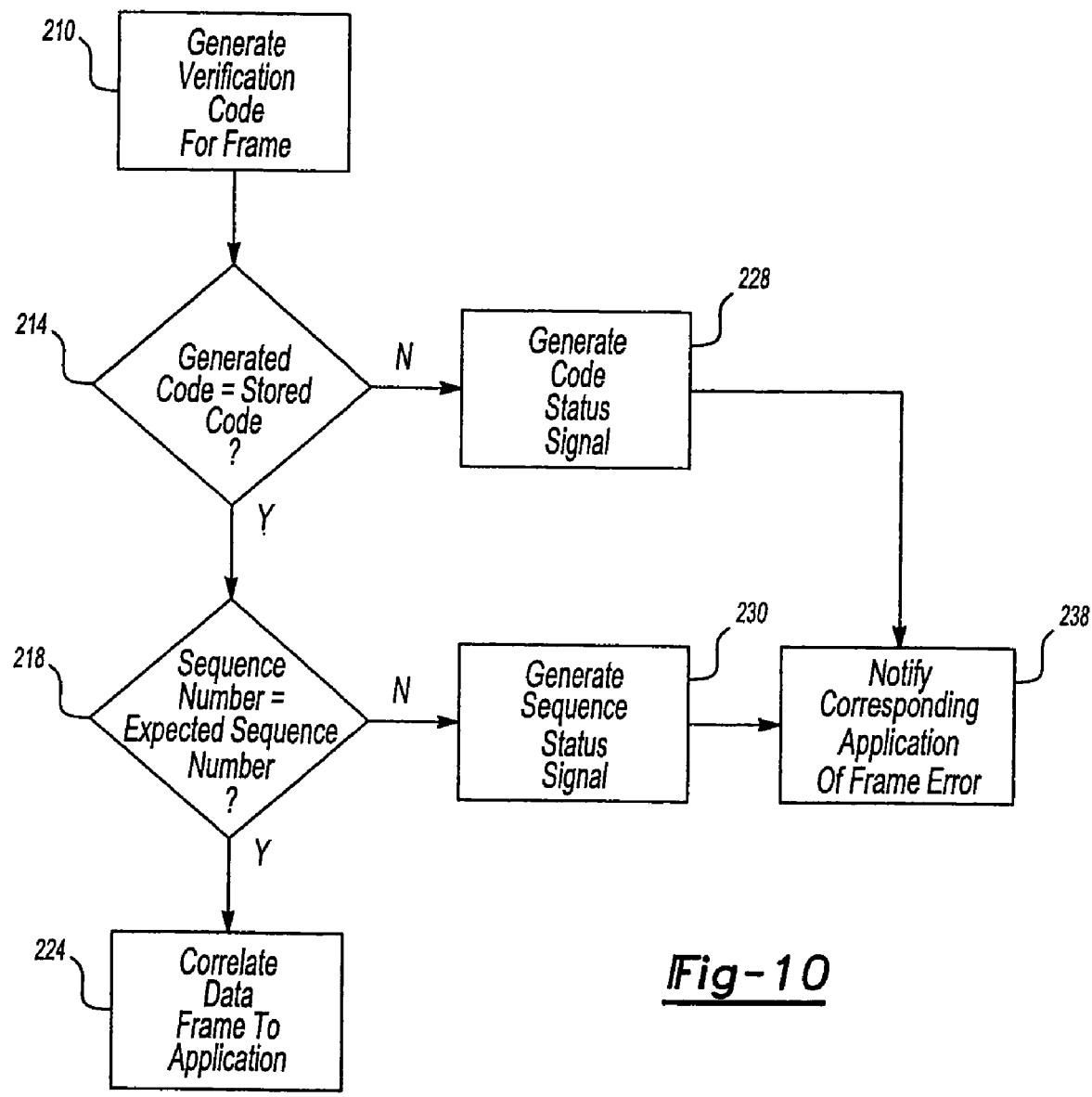
FIG. 10 is a flow diagram of an exemplary process implementing a portion of the transport and dispatch layers in a communication module.

The process for verifying a data frame and correlating it to an application for processing is shown in FIG. 10. As characters are being stored in data frame buffer frame 104 or after all characters of a frame are stored in data frame buffer 104, a verification code is generated (block 210). The verification code may be a cyclic redundancy code (CRC), a checksum, or some other known error indicating code. However, CRC is preferred because it is more robust. The generated code is compared to the verification code in the data frame within buffer 104 (block 214). If they are not the same, a code status signal indicating a verification code error occurred is generated (block 228). Otherwise, the sequence number of the data frame in buffer 104 is compared to the expected sequence number (block 218). If the sequence number is not the expected sequence number, a sequence status signal indicating a message sequence error is generated (block 230). If the verification code and sequence number confirm that a valid data frame has been received, the data frame is correlated to its corresponding application for processing (block 234). If any of the status signals indicate an error occurred during receipt of a data frame, the corresponding application is notified of the frame error (block 238).

Figure 11:
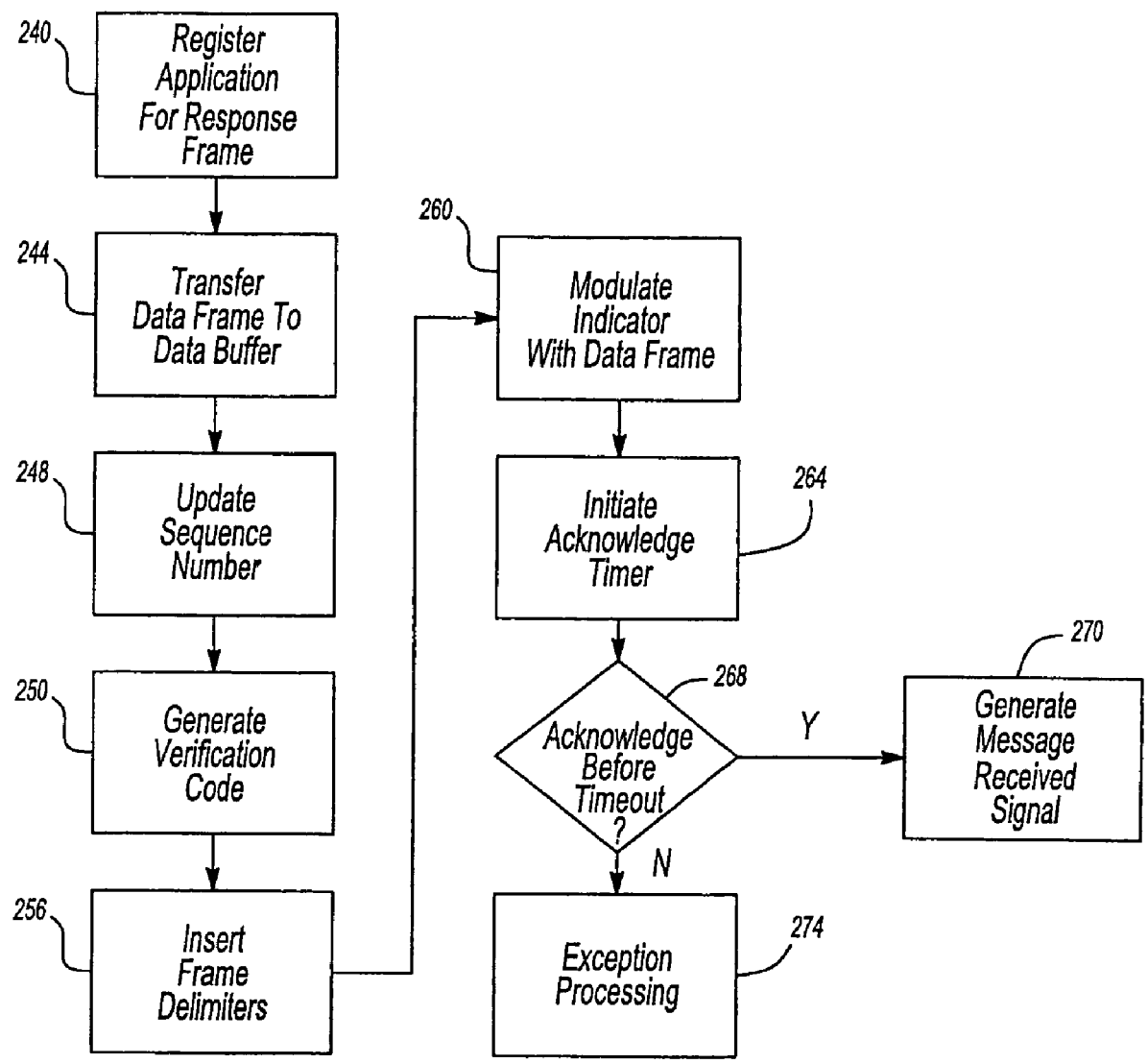
FIG. 11 is a flow diagram of an exemplary process implementing a portion of the process for delivering a data frame from an application to an indicator for transmission to an external device.

A process for delivering a data frame from an application to an indicator is shown in FIG. 11. An application registers for a response data frame to the data frame being delivered for transmission by the application (block 240). Data from the application is transferred to data frame buffer 104 (block 244). The sequence number is updated for the frame in buffer 104 (block 248). The verification code for the frame is computed and included in the frame data (block 250). Frame delimiters are inserted in the frame data to mark the start and end of the frame and to identify any frame delimiter characters embedded within the data frame (block 256). The processed data frame is then used to modulate an indicator (block 260). At the time of the transfer of the data frame to the physical layer for transmission, timer 114 is set to define a period in which an acknowledgement message is expected (block 264). If an acknowledgement message having the same sequence number as the last transmitted data frame is received from the external device before timer 114 expiration and the retry counter reaching the error threshold (block 268), a data frame received signal is generated (block 270). Otherwise, exception processing is performed (block 274).

In operation, an appliance having an optical interface that uses a control panel indicator for communication has a program implementing the communication management module of the present invention installed in its memory. The accompanying hardware components, such as a UART, are also installed in the control circuitry of the appliance. Thereafter, an external device may initiate communication with the controller by bringing an optical transmitter in proximity to the receiver indicator. The receiver indicator generates an electrical data signal that is captured by physical layer 74. Framing layer 78 converts the captured data into frame data and transport layer 80 verifies the frame data. Once the data frame is verified, dispatch layer 84 notifies the corresponding application in application layer 88 that a data frame is ready for processing. If an application generates a data frame for transmission, the application registers with dispatch layer 84 so the application is registered for a response frame. The frame data is stored in a data frame buffer so a verification code may be generated and stored in the data frame. Also, a sequence number for the data frame is generated and stored in the data frame. An expected sequence number for the response is also generated. The framing layer includes frame delimiter characters in the data frame as start and end of frame characters. If any delimiter characters are embedded in the data frame, an additional frame delimiter is inserted to help prevent misidentification of the character as an end of frame character.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. For example, the reader should appreciate that the components of the communication management module may be implemented in either hardware alone, software alone, or a combination of hardware and software. The invention in its broadest aspects is therefore not limited to the specific details, implementations, or illustrative examples shown and described. Accordingly, departures may be made from such details without departing from the spirit or scope of applicant's general inventive concept.

We claim:

1. A communication interface comprising:
   a physical layer for communicating data streams between two computers through at least one indicator of a control panel for operating an apparatus;
   a framing layer within one of the two computers, the framing layer for communicating data streams with the physical layer and for generating frames having a frame start delimiter and a frame stop delimiter;
   a transport layer for verifying frames communicated with the framing layer; and
   a dispatch layer for correlating a verified frame with an application executing within the apparatus for communication of the frame between the dispatch layer and the correlated application.

2. The communication interface of claim 1 wherein the physical layer is a universal asynchronous receiver transmitter (UART) coupled to the at least one indicator lamp to modulate the lamp in accordance with a transmitted data stream.

3. The communication interface of claim 1 wherein the framing layer includes a frame character processor.

4. The communication interface of claim 1 wherein the frame character processor includes a special character detector and a next character comparator.

5. The communication interface of claim 4 wherein the special character detector generates a signal to activate the comparator in response to a special character being detected.

6. The communication interface of claim 5, the next character comparator storing one of a single and a double character sequence in a frame buffer in response to the comparison operation.

7. The communication interface of claim 6 wherein the next character comparator stores a single character in response to the next character being one of a frame delimiter character and a special character.

8. The communication interface of claim 1, the transport layer including a verification code generator to generate a verification code for each frame communicated with the physical layer.

9. The communication interface of claim 8, the transport layer including a verification code comparator for comparing a generated verification code with a verification code included in a frame received from the framing layer to verify a received frame.

10. The communication interface of claim 9 wherein the verification code generator generates a cyclic redundancy code (CRC) for a received frame and the verification code comparator compares a CRC in a received frame with the generated CRC to verify the received frame.

11. The communication interface of claim 1, the transport layer including an expiration timer for timing an interval since the last transmission of a data frame.

12. The communication interface of claim 11 wherein the transport layer communicates a message timeout to the dispatch layer in response to the expiration timer expiring before receipt of an acknowledgement message to the last transmitted data frame.

13. The communication interface of claim 12, the expiration timer further comprising: a retry counter for counting retransmissions of the last transmitted data frame in response to message timeouts from the expiration timer.

14. The communication interface of claim 12 wherein the dispatch layer communicates the message timeout to the application awaiting the response to the communicated frame.

15. The communication interface of claim 1 further comprising a sequence number comparator for comparing a sequence number in a frame with a next sequence number.

16. The communication interface of claim 15 wherein the transport layer verifies a frame in response to the sequence number in the frame corresponding to the next sequence number.

17. The communication interface of claim 15 wherein the transport layer communicates a frame verification message to the dispatch layer in response to the sequence number in the frame corresponding to the next sequence number.

18. The communication interface of claim 1, the dispatch layer including a message type comparator for comparing a message type in a verified frame to a plurality of valid message types.

19. The communication interface of claim 18, the dispatch layer communicating a verified frame to an application in response to a message type in a verified frame corresponding to one of the message types in the plurality of valid message types.

20. The communication interface of claim 1, the dispatch layer including a registered callback function for correlating verified frames to a corresponding application.

21. The communication interface of claim 1 further comprising a usage data application for collecting usage data and providing the usage data to the dispatch layer for communication through the interface.

22. The communication interface of claim 1 further comprising an identification data application for collecting identification data and providing the identification data to the dispatch layer for communication through the interface.

23. The communication interface of claim 1 further comprising:
   an error data memory for storing error data, the error data memory not being initialized during a system reset;
   an operating error detector for detecting a system error; and
   an operating error data application for storing error data in the error data memory in response to the error detector detecting a system error.

24. The communication interface of claim 23 wherein the operating error data application communicates error data from the error data memory through the communication interface in response to receipt of a error data retrieval message.

25. A method for communicating between two computers comprising:
   communicating data streams between two computers through at least one indicator lamp of a control panel for operating an apparatus;
   generating a frame from one of the data streams, the frame having a frame start delimiter and a frame stop delimiter;
   verifying a frame generated from a data stream; and
   correlating a verified frame with an application executing with the apparatus.

26. The communication method of claim 25 wherein the data stream communication includes modulating the indicator lamp in accordance with a transmitted data stream.

27. The communication method of claim 25 wherein the frame generation includes processing characters in the frame.

28. The communication method of claim 27 wherein the frame character processing includes:
detecting a special character in the frame; and
comparing a next character in the frame to one of a frame delimiter character and a special character.

29. The communication method of claim 28 wherein the special character detection includes generating a special character detected signal and the next character comparison occurring in response to the signal.

30. The communication method of claim 29 further comprising:
storing one of a single and double character in a frame buffer in response to the comparison of the next character to a frame delimiter.

31. The communication method of claim 30 wherein the character storage stores a single character in response to the next character being a frame delimiter character.

32. The communication method of claim 25 further comprising:
generating a verification code for each frame.

33. The communication method of claim 32 further comprising:
comparing a generated verification code with a verification code in a frame to verify a received frame.

34. The communication method of claim 33 wherein the verification code generation includes generating a cyclic redundancy code (CRC) for a received frame and the verification code comparison compares a CRC in a received frame with the generated CRC to verify the received frame.

35. The communication method of claim 25 further comprising:
timing an interval since the last transmission of a frame.

36. The communication method of claim 35 further comprising:
communicating a message timeout in response to the timed interval exceeding a message timeout threshold.

37. The communication method of claim 36, the message timeout communication further comprising:
communicating the message timeout to an application executing within the apparatus that is awaiting a response to the transmitted frame.

38. The communication method of claim 25 further comprising:
comparing a sequence number in a frame with a next sequence number.

39. The communication method of claim 38 further comprising:
verifying a frame in response to the sequence number in the frame corresponding to the next sequence number.

40. The communication method of claim 39 further comprising:
communicating a frame verification message in response to the frame verification.

41. The communication method of claim 25 further comprising:
comparing a message type in a verified frame to a plurality of valid message types.

42. The communication method of claim 41 further comprising:
communicating a verified frame to an application executing with the apparatus in response to a message type in a verified frame corresponding to one of the message types in the plurality of valid message types.

43. The communication method of claim 25 further comprising:
correlating verified frames to a corresponding application that is executing within the apparatus.

44. The communication method of claim 25 further comprising:
collecting usage data; and
communicating the usage data through the indicator lamp.

45. The communication method of claim 25 further comprising:
collecting identification data; and
communicating the identification data through the indicator lamp.

46. The communication method of claim 25 further comprising:
detecting a system error; and
storing error data in an error data memory that is not initialized during a system reset in response to detection of a system error.

47. The communication method of claim 25 further comprising:
communicating the stored error data through the indicator lamp in response to an error data retrieval message.

* * * * *